Aug. 2, 1932.  B. F. MASON  1,869,488
ORE AGITATOR
Filed Nov. 12, 1929
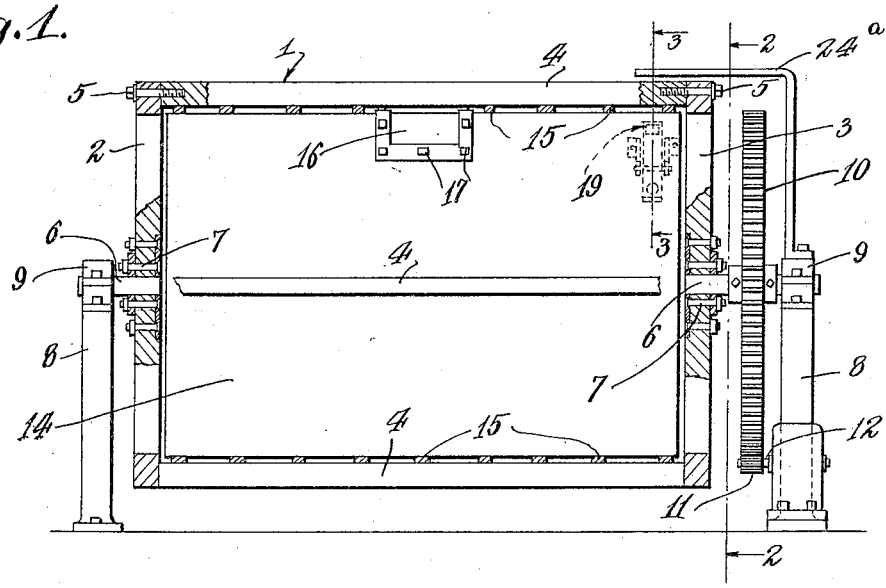
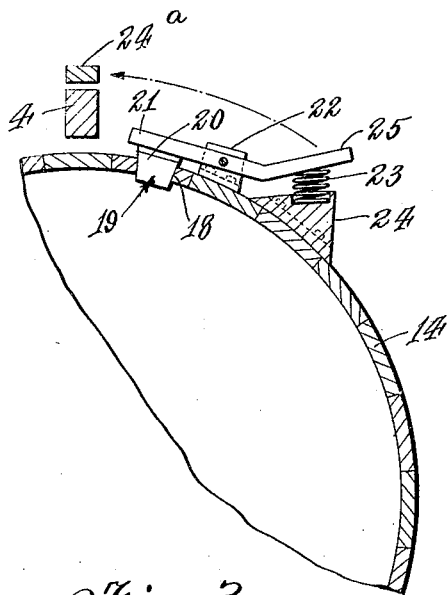
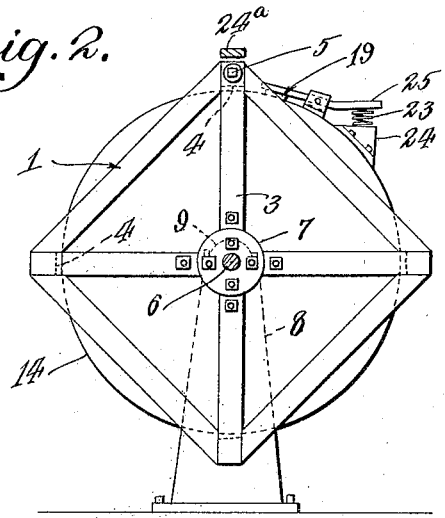
Inventor
Benjamin F. Mason
By Lyon & Lyon
Attorneys Patented Aug. 2, 1932

1,869,488

UNITED STATES PATENT OFFICE

BENJAMIN F. MASON, OF OCEAN PARK, CALIFORNIA

ORE AGITATOR

Application filed November 12, 1929. Serial No. 406,622.

This invention relates to ore agitators, and more particularly to an ore agitator for use in leaching minerals from ores.

In the leaching of minerals from ores, it is essential that a complete and continuous agitation of the leaching solution or acid and the ores be maintained throughout the leaching process in order to effect a complete leaching of the minerals from the ores. As the agitation of the leaching solution with the ores becomes more complete, the time required for the leaching of the minerals from the ore is reduced.

In leaching minerals from ores very large volumes of materials are handled.

It is an object of this invention to provide a means of leaching minerals from ores which is of large capacity, permitting a large volume of the leaching solution and ores to be handled, and which is so constructed as to maintain a continuous agitation of the ores through the leaching solution in a manner to materially reduce the time required for such leaching and to provide a more perfect leaching of the minerals from the ores.

Another object of this invention is to provide an apparatus for leaching minerals from ores which includes a cylinder which is removably mounted in a cradle and which is adapted to receive a relatively large volume of ore to be leached and the requisite leaching solution and which cylinder is adapted to be continuously rotated at a low rate of speed when mounted in the cradle so as to maintain an intimate contacting of the leaching solution with the particles of ore, and which leaching cylinder is also provided with a gas relief valve which is automatically actuated to relieve the gas pressure generated in the cylinder as the cylinder revolves to agitate the ore and leaching solution.

Other objects and advantages of this invention it is believed will be apparent from the following detailed description of a preferred embodiment thereof as illustrated in the accompanying drawing.

In the drawing:

Figure 1 is a side view of an ore agitator embodying this invention.

Figure 2 is a front elevation thereof.

Figure 3 is an enlarged fragmental sectional view of the relief valve embodied in this invention.

In the preferred embodiment of this invention illustrated in the accompanying drawing, 1 indicates a cradle which is formed of spaced vertical end frames 2 and 3 connected together by means of longitudinally extending diametrically opposed frame members 4. Three of the said frame members 4 are securely affixed to the end frame members 2 and 3, while one of the said frame members 4 is releasably connected to the end frame members by means of bolts 5 so as to permit the removal of this frame member 4.

Secured to the end frame members 2 and 3 are trunnions 6. The trunnions 6 extend through the frame members 2 and 3 and are securey affixed in position by any suitable means, as illustrated at 7. Standards 8, carrying bearings 9, are provided at the opposed ends of the cradle 1, and the trunnions 6 are fitted into the bearings 9. Secured to one of the trunnions 6 is a gear 10, which is adapted to mesh with a pinion 11 secured to any suitable or desirable drive shaft 12. The gear 10 and pinion 11 provide a speed reduction means so that the cradle 1 is slowly rotated from the drive shaft 12.

A cylinder 14 is removably mounted in the cradle 1, and is positioned in the cradle 1 by removal of one of the frame members 4 and the bolts 5. The cylinder 14 is of a size and shape affixed closely within the cradle 1 and is to be held in position by means of the longitudinally extending frame members 4 and the frame members 2 and 3. In order to securely affix the cylinder 14 between the frame members 4, small wedge blocks 15 are provided which are driven between the surface of the cylinder, or barrel, 14 and the frame members 4. The cylinder 14 is of large size and is provided with a door 16 which is secured in position by means of bolts 17. The cylinder or barrel 14 is provided with an opening 18 which is normally closed by a relief valve 19. The relief valve is provided for the purpose of the gases formed during the leaching of the minerals from the ores to be exhausted from the cylinder or barrel 14, and is preferably operable so as to open on each revolution of the cylinder 14 as it reaches its uppermost vertical position during its rotation.

The valve 19 is formed with a valve head 20 which seats in the opening 18 in the cylinder 14. The valve head 20 is secured to an arm 21 and is positioned at one end of the cylinder 14. The arm 21 is pivoted intermediate its ends in a bracket 22 secured to the cylinder 14. A spring 23 engages the supposed end of the arm 21 and a boss, or stop, 24 is secured to the cylinder 14 to urge the valve head 20 to seat in the opening 18.

Secured to one of the end supports 8, above the cradle 1, is a bar 24ᵃ which engages the end 25 of the arm 21 on each rotation of the cylinder 14 to cause the arm 21 to pivot in the bracket 22 and lift the valve head 20 from its seat in the opening 18. By this method of operation the gases formed within the cylinder 14 are permitted to exhaust from the cylinder 14 on each revolution of said cylinder, preventing accumulated gas pressure to build up in the cylinder 14.

The cylinder 14 is removably mounted with the cradle 1 to permit a plurality of said cylinders 14 to be employed in the leaching process, and the cylinders to be charged and emptied independently without delaying the process of recovering the minerals from the ores, and also to permit repairs of the cylinder to be made as required without necessitating the shutting down of the entire ore recovery plant.

In operation I have found that as the cylinder 14 is revolved slowly with the leaching solution, the ore tends to adhere to the inner periphery of the relatively large cylinder until it, the ore, is carried upward in the cylinder to a point where the force of gravity overcomes the force acting to cause the ore to adhere to the side of the cylinder, at which time the ore drops slowly back through the leaching solution, and is thus thoroughly agitated and intimately contacted with the leaching solution.

In leaching an ore by this process a complete leaching of the minerals from the ore may be accomplished in a great deal less time than by any method heretofore followed.

In the leaching operation using the cylinder 14, it is preferable that the ore be ground to a rather fine mesh, as ore of a fine mesh will adhere to a greater extent to the sides of the cylinder and will float back through the leaching solution more slowly, obtaining a more perfect agitation and intimate contacting of the ore with the leaching solution.

Having fully described my invention, it is to be understood that I do not wish to be limited to the details herein set forth, but my invention is of the full scope of the appended claim.

I claim:

In an ore agitator, a carriage for rotatably supporting a cylinder in a horizontal position comprising a pair of parallel end frame members, a pair of trunnions each extending horizontally outwardly from each end frame member, said trunnions being coaxial, at least three longitudinal frame members connecting said end members, said longitudinal frame members being parallel to and spaced equidistant from each other and from the axis of said trunnions, a cylinder positioned between said end members coaxial with said trunnions, wedging means compressed between each longitudinal frame member and said cylinder for positively securing said cylinder in said carriage, said wedging means serving as the sole supporting means between said carriage and said cylinder, means for rotatably supporting said trunnions, and means for rotating one of said trunnions.

Signed at Ocean Park, Calif., this 6 day of November, 1929.

BENJAMIN F. MASON.